(No Model.)
P. BEST.
DEVICE FOR THAWING FROZEN LOADS OF COAL, &c.
No. 392,844. Patented Nov. 13, 1888.
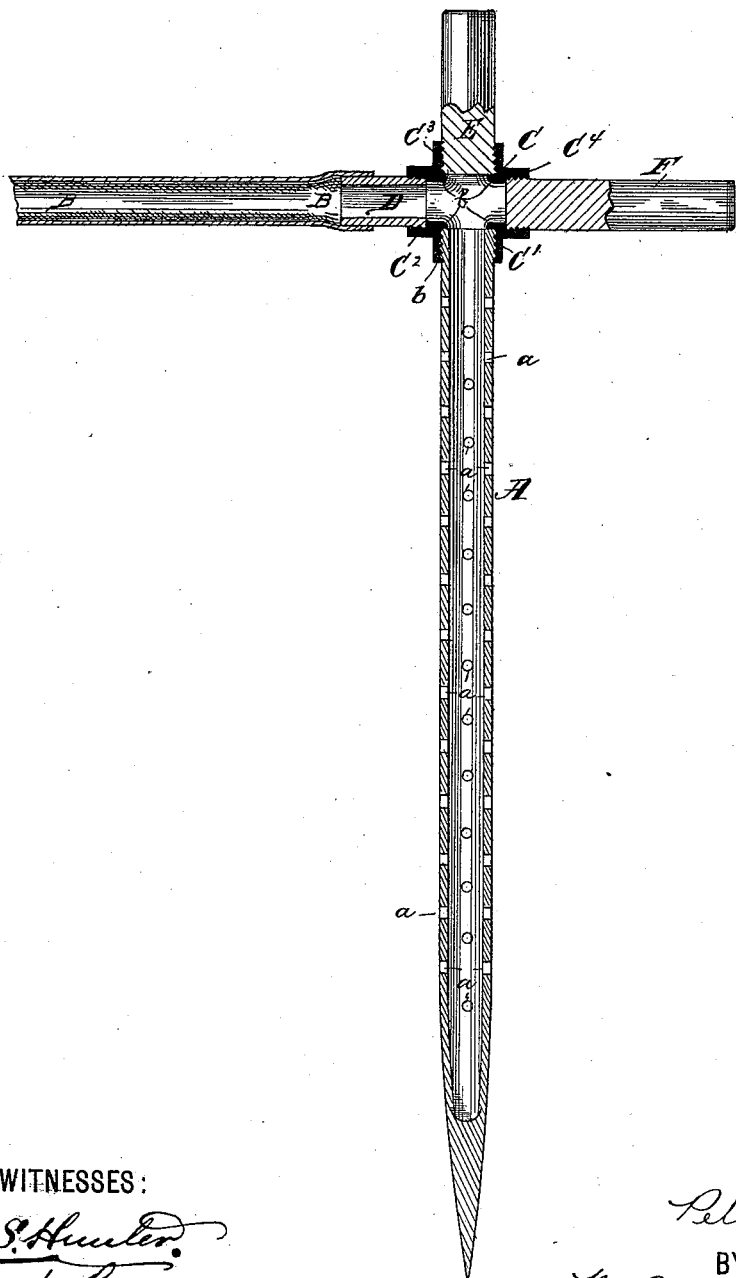
WITNESSES:
INVENTOR,
Peter Best
BY
Wm Sean Bellows
ATTORNEY.

United States Patent Office.

PETER BEST, OF NEWARK, NEW JERSEY.

DEVICE FOR THAWING FROZEN LOADS OF COAL, &c.

SPECIFICATION forming part of Letters Patent No. 392,844, dated November 13, 1888.

Application filed December 7, 1887. Serial No. 257,185. (No model.)

*To all whom it may concern:*

Be it known that I, PETER BEST, a citizen of the United States of America, and a resident of Newark, in the county of Essex and State of New Jersey, have invented certain new and useful Improvements in Implements for Thawing Frozen Loads of Coal, &c., of which the following is a specification.

This invention relates to a means whereby steam may be introduced into the interior of car-loads or other quantities of coal, &c., which are frozen, and consequently incapable of being unloaded or handled, the purpose of which is to thaw the frozen mass; and it consists, essentially, of a tubular spike or shaft suitably adapted to be entered or forced into the body of frozen material, having combined therewith a conduit for conveying steam thereto from any proper supply, all substantially as hereinafter described.

In the accompanying drawing the figure is a central sectional view of a device constructed under the present invention, in which—

A represents the spike or shaft, made interiorly hollow or tubular and provided with radial perforations $a$ in the side walls thereof.

B represents a tube, of rubber or other suitable material, at one end thereof communicating with the said tubular spike A and at its other end with any suitable steam-supply.

As particularly shown in the drawing, a cross or four-way coupling, C, is provided, having branches $C'$ $C^2$ $C^3$ $C^4$, the two branches $C'$ $C^3$ thereof being in the same longitudinal line with the spike A and the branches $C^2$ $C^4$ at right angles thereto. The spike A is exteriorly screw-threaded, as at $b$, at its upper end and engages with threads in the branch $C'$. A tubular extension, D, at the branch $C^2$, which engages with threads thereof, forms a means of attachment of the steam-pipe B, as shown. In the branch $C^3$ is fitted a solid metal plug, E, and forms virtually a continuation of the spike A above the coupling C, and in the branch $C^4$ is screwed another plug, F, which is at right angles to the tubular spike A.

The plug E is provided for the purpose of receiving the impact of a mallet, &c., for driving the spike into the body of the frozen material, while the plug or stud F is intended to be grasped by the hand, whereby to steady the spike as it is being so forced.

When it is desired to thaw and loosen the ice binding the particles of coal, &c., together, the tubular spike A is, through blows received at the extension or plug E, or otherwise, driven for a short distance into the frozen mass, when the steam entered into the interior of the spike, and issuing from the perforations $a$ thereof, permeates the outlying material and thaws the ice. The spike is driven from time to time deeper and deeper into the load, as becomes possible under the thawing process, until it has been forced to the bottom, or as far as is necessary to accomplish the desired result, the utility and practicability of which is entirely obvious without further description.

While steam has been mentioned as employed with the means for introducing same to the frozen body, plainly hot air might be employed with advantage in some cases.

When a device for the purposes of the present invention is constructed, as shown, with a spike A and plug E in line with each other, screwing into threads of coupling branches, it is desirable to provide shoulders $d$ in the coupling for abutment of the lower end of the plug and upper end of the tubular spike, whereby the threads are relieved from strain and liability of being broken.

Having thus described my invention, what I claim, and desire to secure by Letters Patent, is—

1. The combination, with a tubular perforated spike, of a branched coupling to which said spike is attached, a conduit for steam, and a plug, E, attached to said coupling, the latter in line with said spike and the former at an angle thereto, substantially as and for the purpose described.

2. The combination, with a tubular perforated spike, of a branched coupling to which said spike is attached, a conduit for steam, and a plug, F, attached to the coupling at either side at angles to the spike, and a plug, E, attached to the coupling in line with said spike, substantially as and for the purpose described.

3. The combination, with the tubular perforated spike A, of a coupling having socketed branches C' C³, provided with internal shoulders, d, and the socketed branches C² C⁴, the plugs E and F, and the conduit for steam, said plug E and the said spike being entered in the socketed and shouldered branches C' C³, and said plug F and steam-conduit being attached to said branches C² and C⁴, all substantially as shown, and for the purpose described.

In testimony that I claim the foregoing as my invention I have signed my name, in presence of two witnesses, this 28th day of January, 1887.

PETER BEST.

Witnesses:
WM. SEARS BELLOWS,
A. D. PORTER.